Dec. 4, 1945.  F. HERZEGH  2,390,303
BEAD LOCKING RING
Filed Oct. 1, 1942
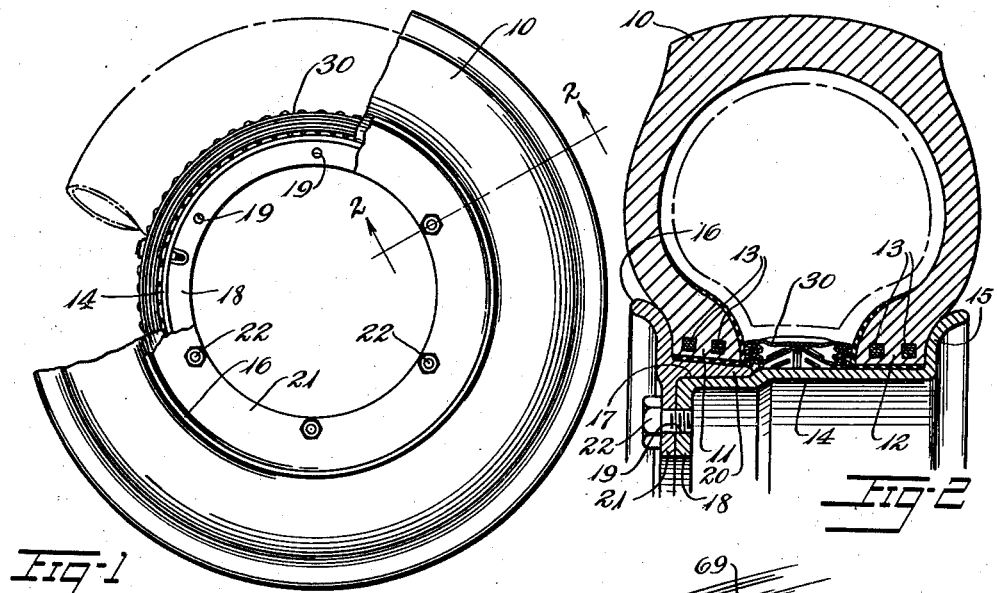
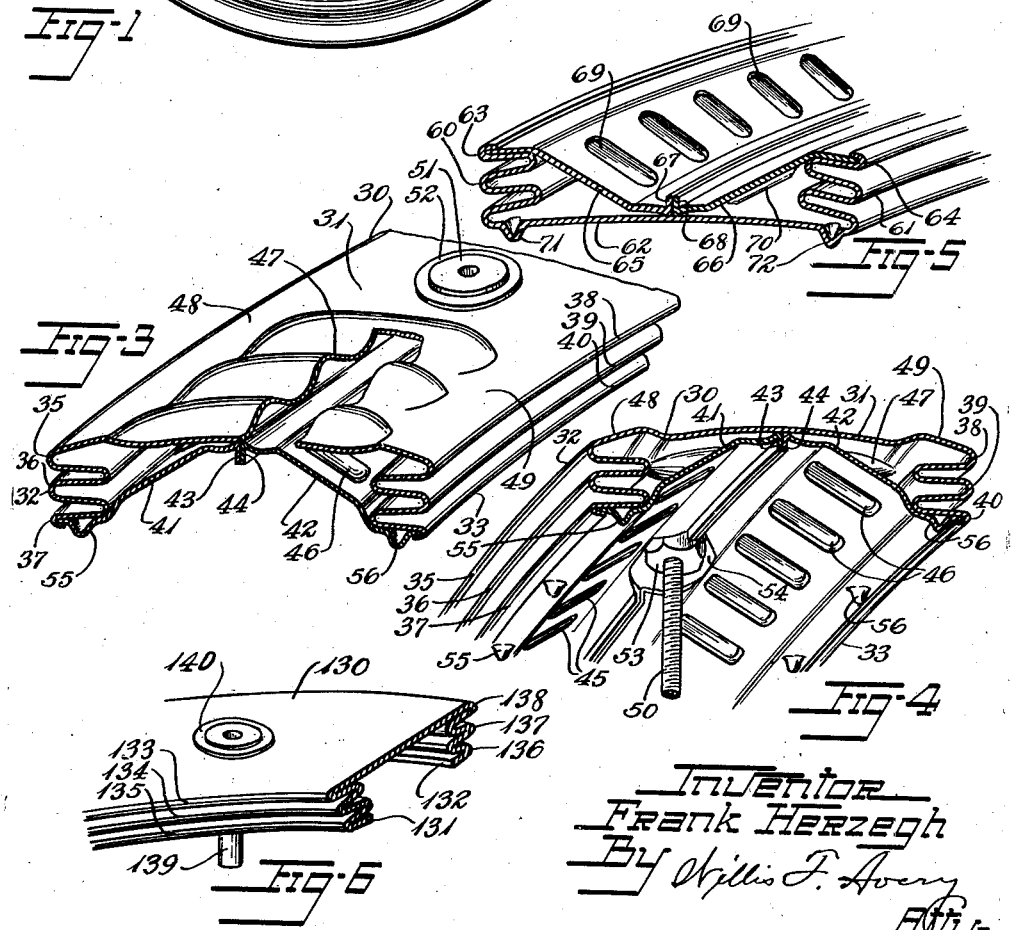
Inventor
Frank Herzegh
By Willis F. Avery
Atty.

Patented Dec. 4, 1945

2,390,303

UNITED STATES PATENT OFFICE 2,390,303

BEAD LOCKING RING

Frank Herzegh, Shaker Heights, Ohio, assignor to The B. F. Goodrich Company, New York, N. Y., a corporation of New York Application October 1, 1942, Serial No. 460,348

6 Claims. (Cl. 152—400)

This invention relates to locking rings for disposition between the bead portions of tires. It is useful for the purpose of restraining movements of such bead portions in tires and also for the purpose of providing an air-tight seal between the bead portions of pneumatic tires so that inflation of the tire casing can be effected without the use of an inner tube, if desired.

This application is in part a continuation of my copending application Serial No. 444,966, filed May 29, 1942, entitled Bead lock, and is directed especially to phases of the ring in which the side portions of the ring are each of unitary construction, rather than a plurality of members, provision being made for a plurality of bead-engaging edges on each side portion, and this application is directed also to improvements in such embodiments.

The chief objects of this invention are to provide an integral construction of each side or bead-engaging portion, to provide for a plurality of radially spaced-apart bead-engaging edges in each side portion, and to provide for convenient and effective manufacture of the ring from sheet metal or other suitable stiff sheet material.

Further objects are to provide strut means for bracing the side portions, and to provide for utilizing air pressure on the outer face of the ring for transmitting pressure to the side portions through the strut means.

Related objects are to provide for lateral stiffness of the ring, to provide circumferential flexibility thereof, and to provide for accommodating the ring to non-uniformities in the bead portions of the tire casing.

These and further objects will be apparent from the following description, reference being had to the accompanying drawing, in which:

Fig. 1 is a side elevation of a tire casing and its securing rim and a bead-locking ring constructed in accordance with and embodying the invention, parts being broken away, the position of the inner tube, when used, being indicated in broken lines.

Fig. 2 is a sectional view, taken along line 2—2 of Fig. 1, the position of the inner tube, when used, being indicated in broken lines.

Fig. 3 is a perspective view of the bead-locking ring of Figs. 1 and 2, as viewed from the outside, parts being broken away and parts being sectioned.

Fig. 4 is a perspective view of the bead-locking ring as viewed from the inside, parts being broken away and parts being sectioned.

Fig. 5 is a view like Fig. 3 but showing a modified construction.

Fig. 6 is a perspective view of a further modified construction, parts being broken away and parts being sectioned.

In accordance with the invention an endless, circumferentially flexible and laterally stiff ring, which may be formed of sheet metal bent to shape or other suitably stiff material, is placed between the bead portions of the tire casing and is provided at its sides with a plurality of radially spaced-apart annular edges adapted to engage the bead portions under pressure by lateral compression of the rim.

Included in the disclosure of my said co-pending application Serial No. 444,966, is an embodiment such as that shown in Fig. 6 herein wherein a single piece of sheet metal is bent to provide a ring including as an integral construction side bead-engaging portions of the sheet metal bent to provide a plurality of the radially spaced-apart edges. Referring to Fig. 6, a single band 130 of sheet metal has marginal portions 131, 132 folded back and forth upon each other in accordian pleats to provide a plurality of rounded sealing faces or edges 133, 134, 135 along one margin for sealing engagement with the bead portions of a tire casing, and spaced-apart sealing faces 136, 137, 138 at the other margin thereof. Sealing faces 133, 138 are farther apart than sealing faces 135, 136 so as to be forced against the sloping faces of the bead portion of the tire casing with equal sealing pressure. The band is made endless to provide continuously annular sealing faces. When made of sufficiently light metal construction it may be distorted sufficiently to permit placement in and removal from a tire casing, the bellows-like action of the accordion pleats contributing to the circumferential flexibility of the ring. A valve stem 139 is clamped to the band at an opening provided therefor and is sealed against the band by a rubber washer 140 so that no inner tube is required. When, however, an inner tube is desired its valve may be passed through the valve aperture in the bead-locking ring.

The stiffness of the sheet metal of the ring resists movement of the free margins 135, 136 of the side portions inwardly toward each other. However, where the ring is subjected to heavy locking pressure against the bead portions of the tire casing it is desirable that added bracing be provided to resist inward yielding of such free margins of the side portions, and the present invention includes provision for these and further improvements.

With reference to Figs. 1 to 4 a locking ring embodying the invention is shown in association with a tire casing 10 having bead portions 11 and 12 reinforced by bead cores 13 and adapted to be seated on a channel rim 14. The rim is of the circumferentially split type, having a fixed rim flange 15 at one side thereof, and a laterally removable rim flange ring 16 at the opposite side. The rim 14 is formed with a rabbeted seat 17 for centering and supporting the removable flange ring, and an inwardly directed flange 18 thereon having spaced-apart threaded openings 19. The removable flange ring 16 has an axially directed flange 20 adapted to be seated on the rabbeted seat 17 and to support the tire casing, and a radially directed flange 21 formed with clearance apertures in alignment with the threaded openings 19 to receive tap bolts 22 for holding the flange ring in place and for clamping the bead portions of the casing against the bead-locking ring.

For clamping the bead portions of the tire casing 10 between the rim flanges against relative circumferential and lateral movement, whether the tire be inflated or deflated, a bead-locking ring 30 of sheet metal or other suitable stiff sheet material is provided. The ring 30 is preferably continuously annular and comprises a transverse bridging portion 31 terminating in side portions 32, 33 depending from the central bridging portion 31 to provide a ring of generally channel shape in cross section. The side portions are bent back and forth upon themselves in accordion or bellows-like fashion to provide a plurality of radially spaced-apart annular bead-engaging edges 35, 36, 37 and 38, 39 and 40, each preferably thin so as to be capable of pressing into the resilient material of the bead portions of the tire casing without requiring excessive clamping pressure, but preferably rounded so as not to cut or rupture the material of the bead portions.

Strut portions 41, 42 are disposed between the free margins 37 and 40 of the side portions and the central region of the bridging portion 31. These strut portions may be in the form of annular rings likewise formed of sheet metal bent to be disposed diagonally in the manner shown and preferably having inwardly turned edge flanges 43, 44, adapted to abut each other where both abut the inner face of the bridging portion 31. For increasing the stiffness of the struts 41, 42 these may be bent to provide depressions or ridges 45, 46. The arrangement is such that inward movement of the free margins 37 and 40 of the side portions is resisted by the strut portions which transmit the pressure against each other and against the inside of the bridging portion 31, so that all the radially spaced-apart edges of the side portions are effective to maintain effective pressure against the bead portions for locking or sealing or both.

Provision is made also for utilizing the force of the air pressure at the outside of the ring to maintain the lateral pressure of all the edges against the bead portions of the tire and make it possible even to increase the pressure of at least some of the edges. To this end the medial region of the bridging portion 31 may be corrugated as shown at 47, the corrugations extending transversely so as to maintain lateral stiffness of the ring while some resilient flexibility is provided throughout this medial region in the radial direction of the ring. The margins 48, 49 of the bridging portion may nevertheless remain uncorrugated as shown. Under strong air pressure at the outer face of the ring the medial corrugated region 47 will tend to be depressed radially inward, which movement or tendency for movement is imparted to the diagonally disposed strut portions 41, 42 and is transmitted as a laterally outward force to the edges 37, 40 of the side portions thus increasing or tending to increase the pressure of these edges against the bead portions of the tire casing. This construction has the advantage not only of further resisting inward yielding of the sealing edges as a result of flexure of the side portions, but also of providing a followup movement of the sealing edges outwardly against the bead portions so that sealing against the latter is maintained even though the resilient material thereof yields by creep or permanent set which is sometimes encountered in rubber or other rubber-like material commonly used in tire construction.

Preferably the bridging portion 31 is bowed in section, as shown, which has the advantage that a radially inward yielding of its medial corrugated zone will not diminish the effective width of the ring at the edges 35, 35, but will tend to increase such width thereby maintaining, if not actually increasing, the pressure of such edges against the bead portions of the tire casing.

The bellows-like folds of the side portions 32, 33 contribute to the circumferential flexibility of the ring to facilitate entry of the ring into position between the bead portions, and also to the flexibility of the ring in twist, by which the ring is better able to conform to bead portions having some non-uniformity.

In the case where the ring is used as a locking ring only, an innertube being provided for retaining air under pressure, the valve stem of the innertube may be passed through an opening in the ring. Where, however, it is desired to utilize the ring as a sealing ring, and eliminate the innertube, the valve stem may be sealed directly in the opening in the ring. This latter construction is shown in Figs. 3 and 4 wherein a valve stem 50 extends through an opening in the bridging portion 31 of the ring and has its base 51 sealed to the ring by means of a sealing washer 52 and a clamping nut 53. The strut portions 41, 42 are relieved to provide a clearance opening 54.

In order that the edges of the ring may engage the bead portions of the tire casing at the desired levels, bosses 55, 56 struck from the sheet metal of the strut portions 41, 42 may be provided for spacing the ring from the rim 14.

In the embodiment of Fig. 5 the side portions 60, 61 of the ring depend from the bridging portion 62 in a radially outward direction rather than a radially inward direction as in the previously described embodiments. Each side portion is bent upon itself to provide a plurality of radially spaced annular edges for engaging the bead portions and the free margins 63, 64 of the side portions may be braced by means of diagonal strut members 65, 66 extending from such margins to the surface of the bridging portion 62 where marginal flanges 67, 68 are in abutment with each other and with the radial outward face of the bridging portion 62 in a manner to resist inward movement of the edges of the side portions when pressed against the bead portions of the tire casing. The strut portions may be depressed locally as at 69, 70, to increase their stiffness in the transverse direction of the ring. The bridging portion 62 may be indented at 71, 72 to provide spacing bosses adapted to rest upon the rim and space the edges of the side portions in the desired relation with reference to the bead portions of the tire casing. Preferably the bridging portion 62 is transversely bowed in a manner shown in Fig. 5 so that strong air pressure against the outer face of the ring, that is, against the strut portions 65, 66 will tend to increase the effective width of the bridging portion and thereby increase the pressure of at least some of the edges againt the bead portions of the tire casing.

Variations may be made without departing from the scope of the invention as it is defined in the following claims.

I claim:

1. A locking and sealing ring for the bead portions of a pneumatic tire casing, said ring comprising an annular member of stiff sheet material bent to provide a central laterally bowed flexible bridging portion having cross-corrugations in said portion and depending side portions terminating in a free margin, said side portions comprising annular protruding edges for exerting pressure against and sealing with said bead portions, and said bridging portion being deflectable under fluid pressure within the tire to increase lateral pressure of the side portions against the tire.

2. A locking ring for the bead portions of a tire casing, said ring comprising an annular member of stiff sheet material formed and arranged to be disposed on the rim radially entirely within the flanges thereof, said member being bent to provide a central laterally bowed flexible bridging portion arranged to extend from bead to bead of the tire casing radially within said flanges and having cross-corrugations in said portion and depending side portions, and angularly disposed strut means for bracing said side portions against inward yielding under pressure against said bead portions, said bridging portion being deflectable under fluid pressure within the tire to increase lateral pressure of the side portions against the tire.

3. A locking ring for the bead portions of a tire casing, said ring comprising an annular member of stiff sheet material bent to provide a central laterally bowed flexible bridging portion and depending side portions, and strut means for bracing said side portions against inward yielding under pressure against said bead portions, said strut means comprising elements disposed diagonally between said central bridging portion and parts of said side portions radially spaced from said bridging portion, said bridging portion being deflectable under fluid pressure within the tire to increase lateral pressure of the side portions against the tire.

4. A locking ring for the bead portions of a pneumatic tire casing, said ring comprising an annular structure including a central bridging portion and depending side portions, said central bridging portion having a portion yieldable radially inward under air pressure at its outer face, and pressure-transmitting strut means extending between such yieldable portion and parts of said side portions radially spaced from said bridging portions.

5. A locking and sealing ring for the bead portions of a pneumatic tire casing, said ring comprising an annular member of sheet metal bent to provide a central bridging portion and depending side portions, said bridging portion having a medial zone corrugated for flexibility in the radial direction while being transversely stiff, said side portions being bent to provide on each side portion a plurality of annular, radially spaced-apart edges for engaging and sealing with said bead portions and a free margin radially spaced from said bridging portion, and annular pressure-transmitting strut elements extending diagonally between the free margin of said side portions and the medial zone of said bridging portion.

6. A pneumatic tire and rim assembly comprising a channeled rim, a tire casing thereon, and a locking and sealing ring for the bead portions of the casing, said ring comprising an annular member of stiff sheet material formed and arranged to be disposed over said rim between said bead portions, the radial extent of said ring being entirely within the radial extent of the side flanges of said rim, the material of said ring being formed to provide a central laterally bowed flexible bridging portion arranged to extend from bead to bead of the tire casing entirely below the radially outer margins of said rim flanges, and the material of said ring being formed also to provide depending side portions, the side portions being formed to provide a plurality of radially spaced-apart annular edges on each side portion for exerting pressure against and sealing with said bead portions, and said bridging portion being deflectable under fluid pressure within the tire to increase lateral pressure of said side portions against the tire.

FRANK HERZEGH.